Feb. 20, 1962 J. L. QUINN ET AL 3,021,950

CARD WIDTH SENSING DEVICE

Filed Nov. 15, 1956 4 Sheets-Sheet 1

INVENTORS
James L. Quinn
James K. Duncan
Carlson, Pitzner, Hubbard & Wolfe
ATTORNEYS INVENTOR
James L. Quinn
James K. Duncan
Carlson, Pitzner, Hubbard & Wolfe
ATTORNEY INVENTORS
James L. Quinn
James R. Duncan
Carlson, Pitzner, Hubbard & Wolfe
ATTORNEYS INVENTORS
James L. Quinn
James K. Duncan
Carlson, Pitzner, Hubbard & Wolfe
ATTORNEYS United States Patent Office 3,021,950
Patented Feb. 20, 1962

3,021,950
CARD WIDTH SENSING DEVICE
James L. Quinn, Chicago, and James K. Duncan, Park Ridge, Ill., assignors to Cummings-Chicago Corp., Chicago, Ill., a corporation of Illinois
Filed Nov. 15, 1956, Ser. No. 622,476
5 Claims. (Cl. 209—82)

This invention relates generally to apparatus for sensing the width of a passing card and more particularly to a photo-electric device that will detect a card flowing in a passing stream of cards having a width that varies slightly from a predetermined standard.

Automatic business machinery that utilizes punched cards is well known and in common commercial use. The punched cards, or so called IBM cards, used in these machines have a series of holes arrayed in coded patterns representing desired information. Accurate sensing of the particular pattern depends upon the card being properly positioned in a "reading" position within the machine. The cards are normally positioned by alining their lateral edges between fixed datum lines and the datum lines are designed to handle cards of a certain standard size.

Often, however, the cards are subjected to hard usage before it is desired to extract their coded information. For example, their edges may be crumpled and torn by carrying in the pocket, or an entire edge or portion of an edge may be trimmed away by an automatic letter opener. Such a card that is no longer of standard size cannot be accurately positioned by the automatically functioning business machine and, hence, cannot be accurately "read."

It is, therefore, desirable to be able to detect and separate a card of non-standard width before it is fed to an information sensing apparatus of any kind. Since the cards are normally automatically fed in large numbers and in rapid succession, an automatic, rapidly acting, and reliable width sensing apparatus is required.

It is an object of the invention to provide an automatic, accurate, reliable and rapidly acting card width sensing apparatus that utilizes photo-electric means which may be easily installed in a standard business machine utilizing punched cards. It is a further object to provide a card width sensing apparatus that measures the width directly, rather than relative to some datum mark, so that the card need not be accurately positioned or alined when being measured.

It is a more detailed object to provide a photo-electric measuring device whose measuring circuit, when a normal dimension is sensed, has an output of zero so that the amplifying and rejecting circuit is undisturbed during routine operation and only comes into play when a non-standard dimension is sensed. It is a related object to provide a novel gating arrangement for disabling the measuring circuit to simulate the zero output condition during the spaces between the cards.

It is moreover an object to provide a card width sensing device of the above character that is extremely sensitive and will positively detect a slight width variation, for example, in the form of a shallow notch, along a short portion of the card length.

Other objects and advantages of the invention will become apparent upon reading the attached detailed description and upon reference to the drawings in which.

While the invention will be described in connection with a preferred embodiment, it will be understood that we do not intend to limit the invention to that embodiment but, on the contrary, intend to cover such alternative embodiments and constructions as may be included within the spirit and scope of the appended claims.

Figure 1:
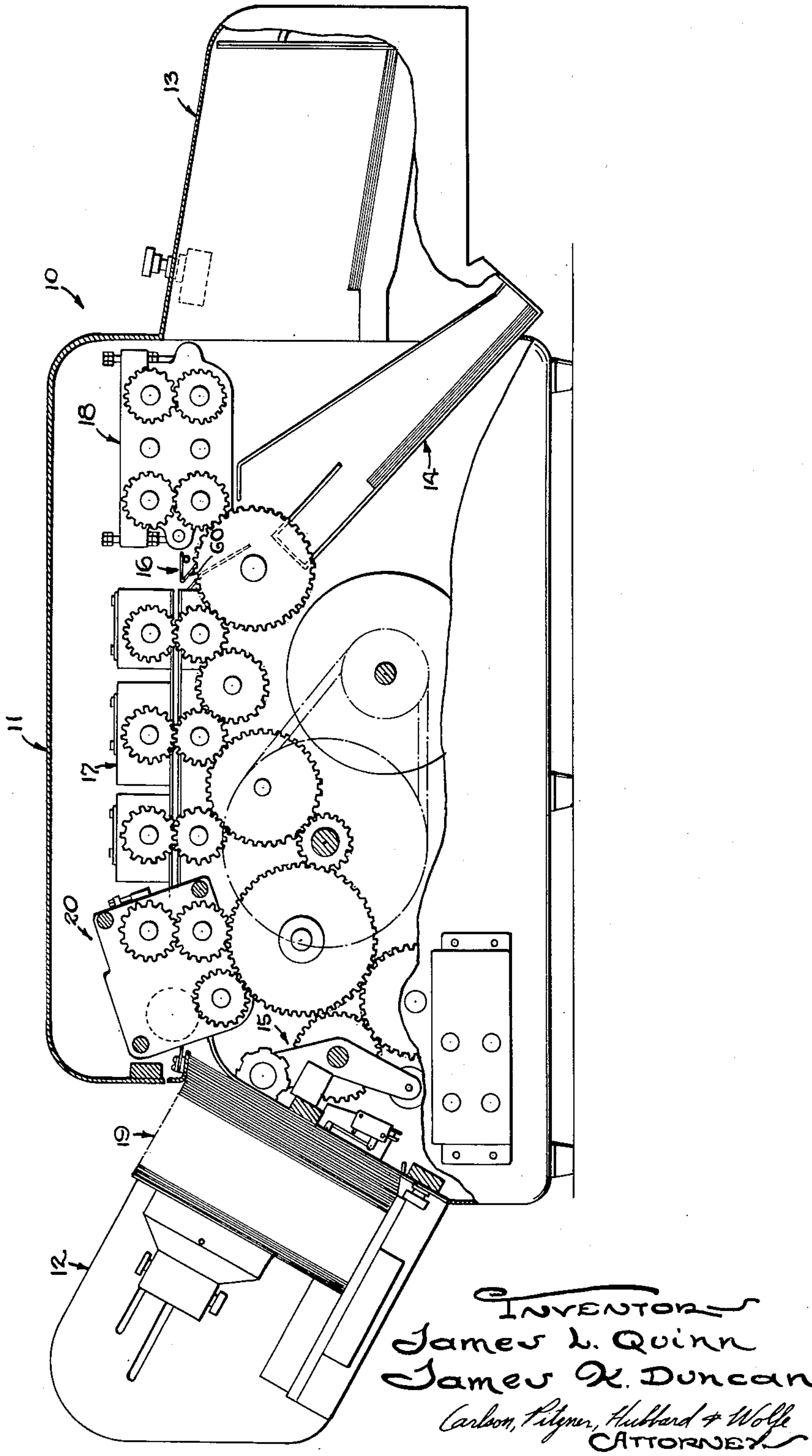
FIGURE 1 is a side view in partial section of a punch card reconditioning machine into which an embodiment of the invention has been installed.
Figure 3:
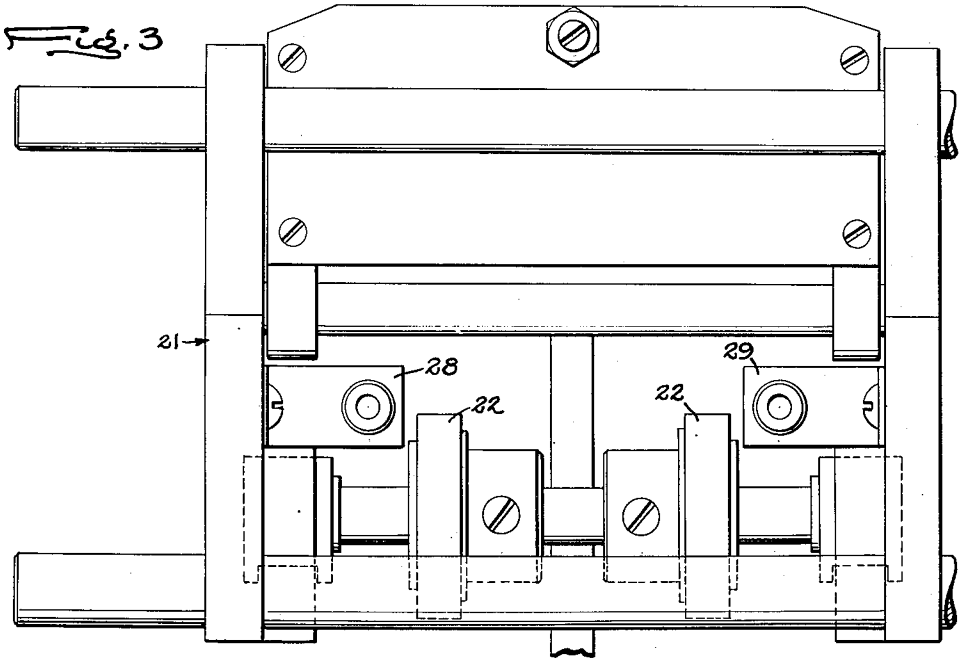
FIG. 3 is a top view taken along the lines 3—3 in FIG. 2.

Turning first to FIG. 1, there is shown a punched card handling business machine 10 in which a width sensing unit 20 embodying the present invention has been installed. The particular machine shown by way of example is a punched card reconditioning machine known as a Carditioner which is fully disclosed in the copending U.S. patent application, Serial No. 484,052, filed January 25, 1955, assigned to the assignee of the present invention. It will be understood that the width sensing device of the invention can be used in conjunction with any type of card handling apparatus and its illustrated application to the type of machine generally indicated herein is only by way of example.

Briefly, the machine 10 shown in FIG. 1 comprises a main body portion 11 from which extends a card input hopper 12 at the left of this figure and two card receiving bins 13, 14 at the opposite end of the machine. To feed the cards one by one from the hopper 12, a sheet feeding unit 15 is disposed within the body 11 adjacent to the hopper bottom. A sensing unit 20 is positioned to receive the cards as they are fed from the hopper. This sensing unit includes means for measuring the thickness as well as the width of the cards. The thickness measuring function is described fully in the copending application and consequently attention may be restricted to the width sensing elements described in detail at a later point. To separate the cards which are found not to be of the correct dimension, a rejecting unit 16 is provided. It will suffice to say here that the card rejecting unit is selectively operable under the control of the sensing unit 20 to either allow cards of standard width to pass through the machine so that they finally fall into the bin 13 or to deflect cards that are not of the correct width downwardly into the bin 14.

In order to carry cards from the sensing unit 20 to the rejecting unit 16, a transport unit 17 is provided comprising a series of cooperating driven rolls. Cards that are found to be of standard width are allowed to pass from the transport unit 17 to a conditioning unit 18 and from there to the receiving bin 13.

In operation a stack of cards 19 is placed in the hopper 12. The feeding unit 15 feeds cards one by one in rapid succession from the stack to the sensing unit 20 where their width is measured according to the invention set forth below. At this point the cards are traveling lengthwise at an approximate velocity of 330 feet per minute. From the sensing unit 20 the cards are fed in a steady stream by the transport unit 17 to the rejecting unit 16. Those cards which were found to be not of standard width are deflected from the stream by the rejecting unit 16 while the standard cards pass into and through the conditioning unit 18 to the bin 13.

The sensing unit 20 comprises a sub frame 21 which is adapted to support the entire assembly for easy mounting within the machine body 11. Journaled within the sub-frame are two sets of rollers 22, 23, and 24, 25. Rollers 22, 23 serve as "pull" rolls, that is they draw a card into the machine that has been separated from the stack 19 by the feeding unit 15. The rollers 22, 23 pull the card from the feeding unit around the curved bottom 26 of the hopper 12, driving it along the guide plate 27. The rollers 24, 25 engage the card as it moves along the guide plate 27 and propel it into the driven rolls of the transport unit 17.

For the purpose of deflecting cards not of standard width from the stream of cards flowing into and through the conditioner unit 18, the rejecting unit 16 is provided. This unit comprises a pivoted vane type deflector 60 shown in FIG. 7. The deflector 60 is actuated to the dashed line position shown in FIG. 7 by the energization of solenoid 61. When energized, the solenoid 61 pulls down lever 62 which rotates a gear segment 63 meshing with a gear 64 fixed to the deflector 60. A spring 65 urges the lever upwardly and resiliently holds the deflector in its lower non-deflecting position. It can be seen that each time the deflector 60 extends upwardly into the path of card travel so that the oncoming cards propelled by the transport unit 17 will be guided beneath the deflector into the bin 14.

Figure 4:
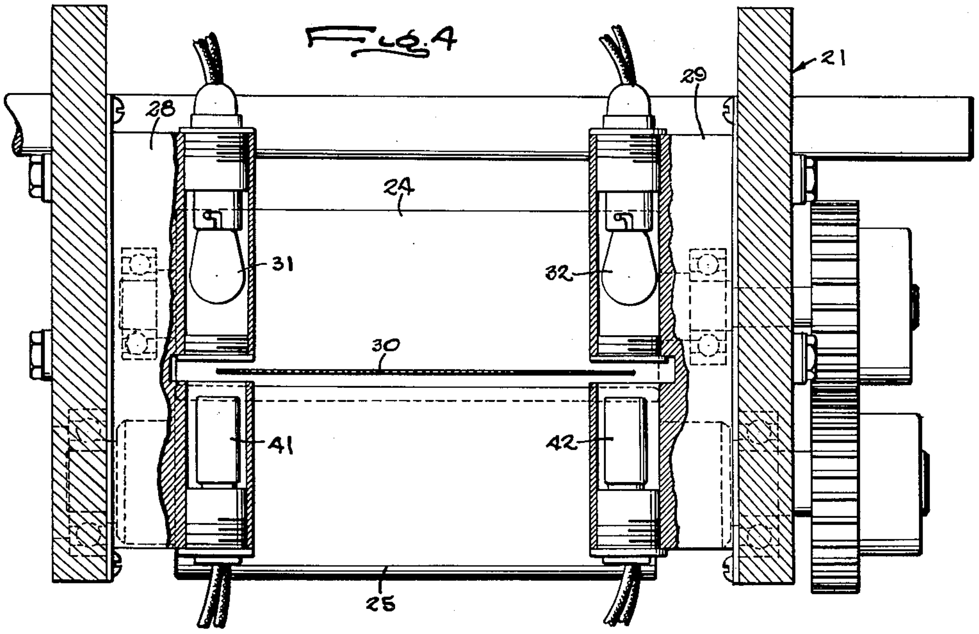
FIG. 4 is a partial sectional view taken along the lines 4—4 in FIG. 2.

In accordance with the present invention, two photocells are positioned in the sensing unit 20 to receive shafts of light which are partially blocked by opposite lateral edges of a card being sensed so that shifting the card laterally will increase the light on one photocell to proportionally balance the decrease of light on the opposite photocell, the cells being connected in a balanced electric circuit so that only an increase or decrease in total light falling on both cells taken together will trigger the card rejecting device 16. In the illustrated embodiment two lamps 31, 32 cooperate with two photocells 41, 42 respectively, the lamps 31 and the cell 41 being mounted in a U-shaped housing 28, and the lamp 32 and cell 42 being mounted in a U-shaped housing 29. The housings 28, 29 are fixed to the opposite walls of the sub-frame 21 and are positioned so that the photocells 41, 42 are spaced apart a distance equal to the desired standard card width. Therefore, when a card 30 of standard width is passing on guide plate 27 exactly between the cells 41, 42, as in FIGS. 4 and 5, one-half of the light beam from each lamp will be cut off by the lateral edges of the card.

Figure 6:
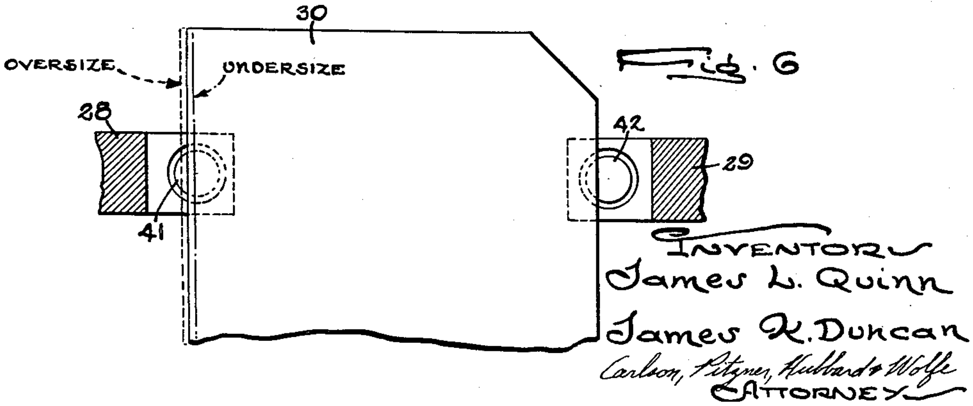
FIG. 6 is a fragmentary plan view similar to FIG. 5 but with the card shifted.

In normal operation it cannot be expected that passing cards will be positioned exactly between the cells, but it can be readily seen that the amount of light reaching the cells 41, 42 remains substantially the same, when taken together, if the card shifts from side to side. For as the shifting card further blocks one shaft of light, the card also unblocks the other light shaft in an exactly equal amount as can be seen in FIG. 6, and thus the total radiation received by the two cells remains constant no matter how a standard card shifts as it passes through the shafts of light. A card that is more narrow than standard width, passing through the sensing unit 20, will cause the cells 41, 42 to receive a greater total radiation, since one of the light shafts will be unblocked without a compensating further blocking of the opposite shaft of light. Conversely, the cells 41, 42 receive a lesser total radiation if a card is wider than standard. It is therefore apparent that the total radiation received by the two photocells 41, 42 is directly related to the width of a passing card and is not affected by the lateral position of the card, providing a direct measurement of card width.

Figures 7, 8, 9:
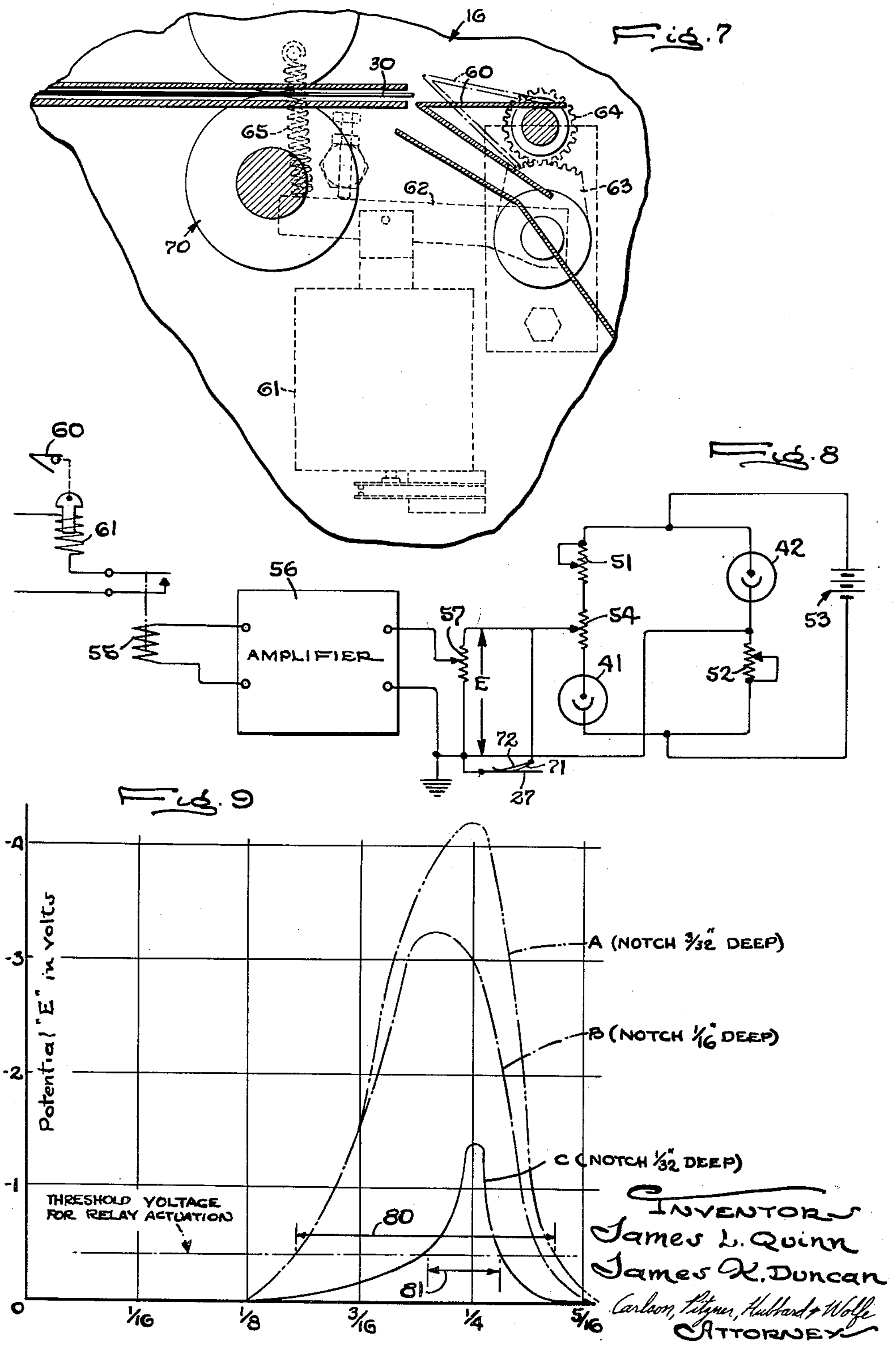
FIG. 7 is a fragmentary sectional view of the deflector unit shown generally in FIG. 1.
FIG. 8 is a schematic viewing diagram of a circuit embodying the invention.
FIG. 9 is a graph showing the performance of the width sensing device under certain conditions.

Further in accordance with the invention, the circuit connecting the two photocells 41, 42 is electrically balanced so that when a given total amount of light strikes the two cells taken together, the circuit output is substantially zero no matter how the light is proportioned between the two cells. In the preferred embodiment the cells 41, 42 are of the photo-resistive type, composed of lead sulfide for example, and they are connected in electrical balance by placing them in opposite legs of a balanced bridge circuit as shown in FIG. 8. An input voltage is imposed on the bridge by a direct current source 53 but when the bridge is in balance there is no output potential E. It will be apparent that this balance is not disturbed if an increase in the resistance of cell 41 is compensated for by a corresponding decrease in the resistance of cell 42, and vice versa. However, should a change in the resistance of one of the photocells 41, 42 not be compensated by an equal and opposite change in the other cell, the bridge will be thrown out of balance and there will be an output potential E.

The bridge is brought into balance by adjusting variable resistors 51, 52 forming the remaining legs of the bridge so that the effect of photocells 41, 42, respectively, on the network is equalized. Then the variable resistance device 54 constituting a fine balance control is adjusted so that there is no output potential when a card of standard width is being sensed.

In operation, the balanced photocell circuit has the effect of being responsive only to changes in the total radiation received by the two photocells 41, 42, since simply reapportioning a given amount of radiation by increasing the amount received by the one cell and equally decreasing the amount received by the other cell produces equal and opposite changes in the resistance of the cells, and maintains the bridge circuit in balance. It is only when a wider or narrower card passes between the light beams that a greater or lesser amount of radiation respectively is allowed to fall on the cells 41, 42 to thereby cause a change in the resistance of one of the cells that is not compensated by an opposite and equal change in the other cell.

To actuate the deflector unit 16 the bridge output potential E caused by a card of non-standard width creates a signal which is amplified to close a relay 55 which in turn completes a circuit to energize the deflector solenoid 61. The amplifier 56 can be of any well known type that will produce an output signal substantially greater and in direct proportion to the input signal caused by the bridge potential E.

It will be understood that the pick-up and drop-out characteristics of relay 55 and solenoid 61 should be tailored to the transit time so that the card deflected is the one that was discovered to be wider or more narrow than standard without disturbing those cards immediately preceding or following it in the stream of cards flowing through the machine. For maximum reliability and effectiveness it may be found desirable to provide a more elaborate control circuit than the one disclosed here simply for exemplary purposes. For example, it will be apparent to one skilled in the art that relay 55 may be provided with a lock-in circuit which will delay its actuation until the offending card has arrived at the deflector. A suitable control circuit is fully disclosed in copending U.S. patent application Serial No. 577,723, filed April 12, 1956, now Patent No. 2,903,133, assigned to the assignee of the present invention.

Figure 2:
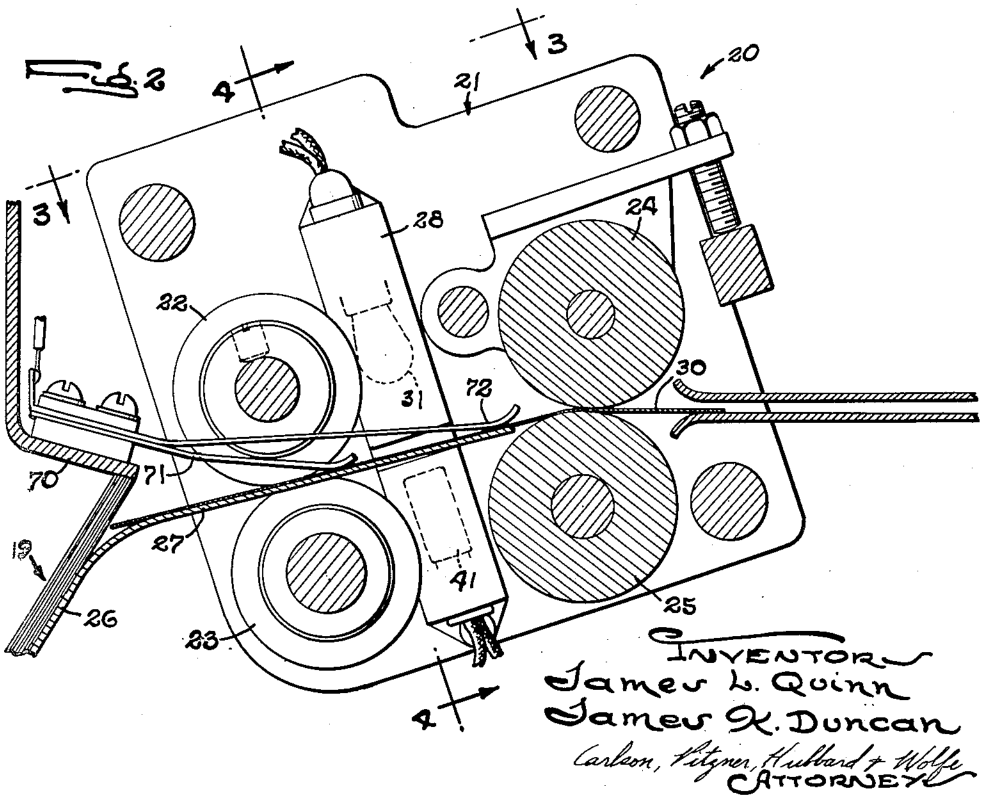
FIG. 2 is a side sectional view of the width sensing device shown generally in FIG. 1 with the frame broken away to reveal the width sensing elements.

Also in accordance with the invention, gating means are provided for simulating the zero output condition of the photocell circuit between successive cards so that the photocell circuit is ineffective to trigger the card rejecting device 16 unless a card is in sensing position. This is accomplished in the present instance by grounding the bridge output by means of a gate switch that is only opened when a card is in the proper position to be sensed. The gate switch comprises two spring switch contacts 71, 72 mounted, as shown in FIG. 2, on the card feeder separating plate 70 so that the contact 71 engages the plate 27 on the upstream side of the housings 28, 29 and the contact 72 engages the plate on the downstream side of the housings. In the device illustrated, the points of contact are spaced about one-half inch in each direction from the photocells. The bridge output is grounded if either of the contacts 71, 72 engages the plate 27, as can be seen in FIGS. 2 and 8. It is therefore apparent that a card must pass through the sensing unit 20, first lifting contact 71 and then lifting the contact 72, before the bridge output E is available to trigger the card rejecting unit. In this way the space between successive cards does not cause the rejecting unit to be actuated. It is also to be noted that width variations in the first or last one-half inch of the card cannot actuate the deflector 60, since a card must extend at least that far through the sensing unit before each of the two contacts 71, 72 is lifted. Thus, the normal diagonal cut removing a corner of a standard punched card will not cause the card to be rejected.

A significant operating feature of the invention is the fact that when standard width undamaged cards are being passed the amplifier 56 and the deflector circuit does not receive a signal from the sensing photocells 41, 42. In the intervals between such cards the gate switch grounds the output of the bridge circuit so that the amplifier is not disturbed as one card leaves the sensing position and another takes its place. In this way the amplifier and card reject circuit remains poised until called into action by the presence of a card that is not of standard width.

To adjust the sensitivity of the width sensing unit 20 a potentiometer 57 is provided. In order to trip the relay 55 an input signal of a certain strength must be fed into the amplifier 56, and it can be seen that the value of potential E required to produce an input signal of that strength is dependent on the setting of the potentiometer 57. The value of potential E is in turn dependent upon the amount a card being sensed varies from the predetermined standard width, since the greater the variation the greater the bridge circuit unbalance which creates the potential E. Therefore if device 57 is set so that a high potential E is required to produce an input signal that will trip relay 55, then a card must vary widely from standard before the bridge circuit is sufficiently unbalanced to cause tripping of the relay. On the other hand, device 57 can be adjusted so that only a slight potential E will be sufficient to produce a signal that will trip the relay and, therefore, the relay will be tripped if the card varies only slightly from standard width.

It has been found that a card of normal width appears to create a slight pulsating output potential E. This apparent output results from the variation in the radiation from the lamps 31, 32 caused by the 60 cycle A.-C. lamp power supply and is not due to the passing cards. It is a feature of the invention that the lamps 31, 32 are standard lamps operated at one-half normal voltage which appreciably lengthens their life and tends to smooth out the 60 cycle variation to a negligible value. The low voltage has no effect on the photocell sensitivity since it results in a shaft of radiation rich in infra-red, to which the lead sulphide cells 41, 42 are sensitive.

The high sensitivity of the device is partly attributable to the small photocells used which have a window opening of approximately only 3/16 of an inch. A slight shift in the card edge which partially covers the window produces a large proportional variation in the area of the window exposed. That is, a difference of 3/16 of an inch, or approximately only 6% of the total width of a standard card, is enough to cause the cell to go from total actuation to no actuation at all. Therefore, a very slight lateral shift in a card edge blocking the radiation to one cell causes an appreciable change in the proportion of light and dark areas on that cell which is immediately reflected in the balance of the bridge circuit.

Figure 5:
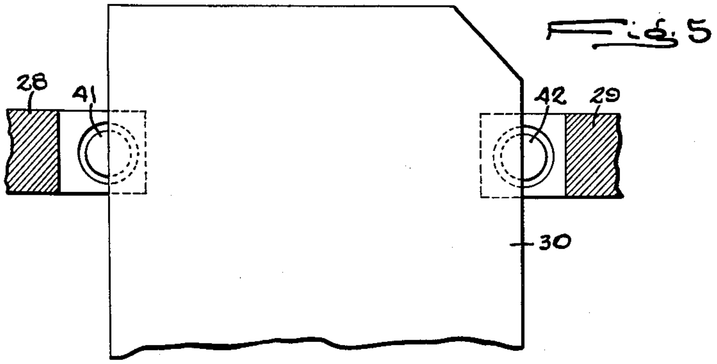
FIG. 5 is a fragmentary plan view of a standard size card passing the sensing device of the invention.

It will be appreciated that when a card is centered between the two shafts of radiation, as in FIG. 5, a slight variation in width will cover or uncover a fairly large segment of one of the photocells. However, when the card is shifted to one side, as in FIG. 6, the same variation in width will cover or uncover a much smaller segment of the photocells. Since the circuit output depends upon the area covered or uncovered at one cell it can be seen that the device will be more sensitive, and responsive to slighter width variations, if the cards are guided past the photocells with their edges approximately centered with respect to each cell.

The maximum sensitivity of the device for various lateral positions of a punched card is graphically illustrated in FIG. 9. The information plotted was obtained by moving three cards, A, B and C, of known variation from standard width laterally across the path of card travel in the device from a position where one cell was entirely blocked, through a laterally centered position, and to a position where the opposite cell was totally blocked. It can be noted that the circuit output rises to a peak as the cards are nearly centered between the two photocells, but that a card 3/32 of an inch more narrow than standard can be shifted laterally through a distance 80 (approximately 1/7 of an inch) and still cause the circuit to produce a sufficient output to trigger the relay 55. In order to detect width variations of only 1/32 of an inch, it can be seen that the passing cards must be guided so as not to shift laterally more than the dimension 81, or approximately 3/64 of an inch. It can thus be seen that the card feeding and guiding means must be adjusted to impose limits on the lateral shifting of the cards corresponding to the degree of sensitivity desired from the sensing device.

We claim as our invention:

1. In a card handling apparatus having a path along which cards are conveyed seriatim, a card width sensing device comprising, in combination, two photocells positioned one on each side of said path, a source of radiation for each cell positioned to direct a beam of light toward each cell, said beams being spaced so that the beams are partially blocked by the opposite lateral edge portions of a standard width card passing along said path between the beams, said beams being of equal cross section so that lateral shifting of the card will uncover one beam an amount equal to the further blocking of the opposite beam whereby the total radiation received by the two cells will remain a constant for a card of standard width, circuit means connecting said cells in opposed, compensating electrical balance so that said constant amount of total radiation received by the two cells, no matter how distributed between them, will give no circuit output, while an increase or decrease in total radiation from said constant will result in a circuit output, and means including a card handling device responsive to an output from said circuit.

2. In a card handling apparatus having a path along which cards are conveyed seriatim, a card width sensing device comprising, in combination, two photocells positioned one on each side of said path, a source of radiation for each cell positioned to direct a beam of light toward each cell, said beams being spaced so that the beams are partially blocked by the opposite lateral edge portions of a standard width card passing along said path between the beams, said beams being of equal cross section so that lateral shifting of the card will uncover one beam an amount equal to the further blocking of the opposite beam whereby the total radiation received by the two cells will remain a constant for a card of standard width, circuit means connecting said cells in opposed compensating electrical balance so that said constant amount of total radiation received by the two cells, no matter how distributed between them, will give no circuit output, while an increase or decrease in total radiation from said constant will result in a circuit output, and a gating switch positioned to ground any output from said circuit unless a card is passing said beams, and a card rejecting device responsive to an output from said circuit means.

3. In a card handling apparatus having a path along which cards are conveyed seriatim, a card width sensing device comprising, in combination, two photocells positioned one on each side of said path, a source of radiation for each cell positioned to direct a beam of light toward each cell, said beams being spaced so that the beams are partially blocked by the opposite lateral edge portions of a standard width card passing along said path between the beams, said beams being of equal cross section so that lateral shifting of the card will uncover one beam an amount equal to the further blocking of the opposite beam whereby the total radiation received by the two cells will remain a constant for a card of standard width, circuit means connecting said cells in opposed compensating electrical balance so that said constant amount of total radiation received by the two cells, no matter how distributed between them, will give no circuit output, while an increase or decrease in total radiation from said constant will result in a circuit output, and a gating switch comprising contacts coupled to said circuit and being spaced along said path one on either side of said photocells in electrical contact with said apparatus so that any output from said circuit is grounded (1) between successive cards passing between said beams and (2) as the extreme leading and trailing portions of each card passes the beams.

4. A card width sensing apparatus comprising two spaced photocells, a device for acting on cards, circuit means connecting said cells in opposed compensating electrical balance so that upon an increase or decrease from a predetermined magnitude of a total amount of radiation striking both cells a signal will be generated to actuate said device, and a source of radiation for each cell directing a beam toward each photocell with each beam positioned to be partially blocked by an opposite lateral edge of a card whose edge to edge width is to be sensed so that any lateral shifting of the card will uncover one beam an amount equal to the further blocking of the opposite beam and thus keep constant the total radiation falling on said cells.

5. A sensing apparatus for detecting a card of non-standard width in a stream of cards comprising two photocells spaced on opposite sides of the path of card travel, a radiation source for each cell directing a beam toward each photocell, said beams being positioned so that the beams are partially interrupted by the opposite lateral edges of a card of standard width passing through a sensing position along said path, circuit means including an electrical bridge circuit connecting said photocells in opposite legs thereof, said circuit means being balanced so that its output is zero only when the photocells are actuated by a fixed total radiation equaling the sum of said beams when partially interrupted by a card of normal width, means to ground any output from said circuit means unless a card is in said sensing position, and means responsive to the non-grounded output of said circuit means to deflect a card of non-standard width from the stream of cards.

References Cited in the file of this patent

UNITED STATES PATENTS

| | | |
|---|---|---|
| 1,722,751 | Jones | July 30, 1929 |
| 2,237,811 | Cockrell | Apr. 8, 1941 |
| 2,415,174 | Hurley | Feb. 4, 1947 |
| 2,415,177 | Hurley | Feb. 4, 1947 |
| 2,742,151 | Milford | Apr. 17, 1956 |

OTHER REFERENCES

Article by Edelman, Electronic Industries, May 1944.